Jan. 31, 1967  D. S. CHISHOLM  3,301,932
METHOD FOR PRODUCING COATED ARTICLES
Filed May 31, 1961  2 Sheets-Sheet 1

INVENTOR.
Douglas S. Chisholm
BY
Richard D. Waterman
AGENT

INVENTOR.
Douglas S. Chisholm
BY
Richard J. Waterman
AGENT

United States Patent Office 3,301,932
Patented Jan. 31, 1967

3,301,932
METHOD FOR PRODUCING COATED ARTICLES
Douglas S. Chisholm, Midland, Mich., assignor to The Dow Chemical Company, Midland, Mich., a corporation of Delaware
Filed May 31, 1961, Ser. No. 113,691
22 Claims. (Cl. 264—174)

This invention relates to a method of producing articles which may generally be described as ribbon-like or tape-like in character. More specifically, it relates to a method of coating running webs of materials with normally solid film-forming thermoplastic resins. The invention is particularly concerned with bonding in parallel relationship strandular materials wherein a thermoplastic resin serves to coat the individual strands, filaments, cords and the like while simultaneously forming a bond between the strands so that a continuous surface is generated.

Many, and most, materials possess properties and characteristics which enable them to be utilized for a particular function to better advantage than another material. Unfortunately, the environment in which the function-providing material is to be utilized detracts from or even prohibits the use of the material that can best provide the optimum efficiency or better economic advantage. For instance, a material that has superior tensile strength when dry but relatively poor tensile strength when wet would not be suitable to employ, for example, as roping material if it were to be used under wet or high moisture conditions. Similarly, other materials may be deleteriously affected by oxidation, ultraviolet light, etc. Electrical conductors must usually be insulated from each other, from moisture or from human touch. Paper and paperboard, which frequently holds an economic advantage associated with its inherent physical properties, must be coated when used for liquid containers and the like. Considerable effort has been put forth both in the realm of finding compatible inert coatings to enable a more diversified application of desirably functional materials, and in the realm of finding suitable means for applying the coatings, finishes and the like to the functional substrate materials.

It is among the principal objects of this invention to provide a means for continuously applying a coating material to a group of traveling independent strandular substrates wherein a continuous web consisting of the strands and the coating is produced. It is a further object to provide a means for continuously and simultaneously coating a traveling substrate web on at least the two opposing sides of the substrate. It is a still further object to provide a means for continuously completely encapsulating a traveling substrate web with a coating material. Another object of this invention is to provide an apparatus which will efficiently, continuously and uniformly coat strandular and related substrate materials on at least two sides simultaneously, and preferably totally encapsulate the substrate with coated material. A yet further object is to provide utile coated products which have manifold uses and which particularly take advantage of the combined superior characteristics of the substrate material and the coating material.

All of the foregoing and still further objects and advantages are readily achieved by practice of and in accordance with the present invention wherein a strandular or relatively flat web-like substrate is passed through an orifice-like opening between a pair of counter-rotating rolls, and the rolls are rotated counter to the direction of web travel, that is, the direction of travel of the surface of the rolls at the point at which the substrate passes between the rolls is essentially opposite to the direction of travel of the substrate passing therethrough. A normally solid thermoplastic resin, in liquid, and preferably in molten condition, is applied to each of the rolls at a point prior to the nip formed between the rolls. The substrate passing between the nip is thus provided with a tightly adhering and frequently totally encapsulating coating of the resin.

The resulting coated structures or articles which may advantageously be obtained by practice of the present invention possess, to an unusual degree, all the desirable attributes to the substrate and the coating material and frequently the results represent more than additive qualities. Excellent results are achieved where two or more strandular or funicular substrates such as filaments, wires and so forth are treated in side-by-side relationship according to the invention. The thermoplastic resin in this instance not only provides a beneficial coating but also serves to actually fabricate a web-like article.

Yet additional objects and advantages of the invention, and its numerous cognate benefits and features, are even more apparent and readily manifest in and by the ensuing description and specification, taken in conjunction with the accompanying drawing in which, wheresoever possible, like characters of reference designate corresponding materials and parts throughout the several views thereof, and wherein:

FIGURE 1 perspectively depicts a tape of an encapsulated group of cords from twisted continuous filament yarns in accordance with the invention;

Figure 4:
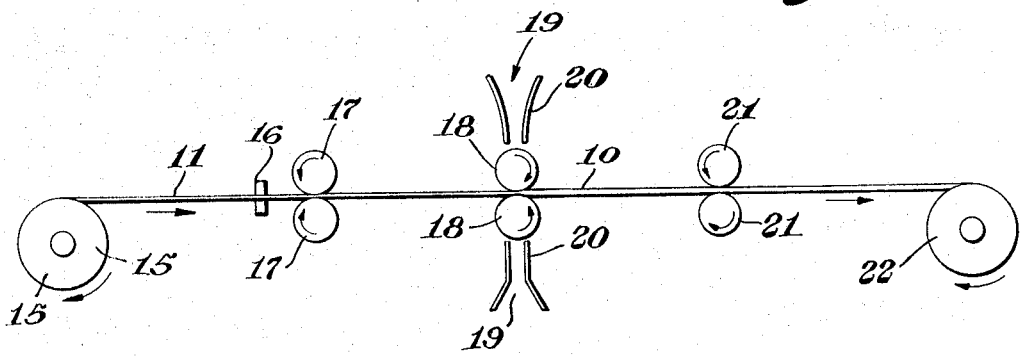
Figure 8:
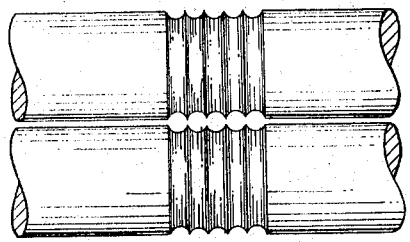
Figure 9:
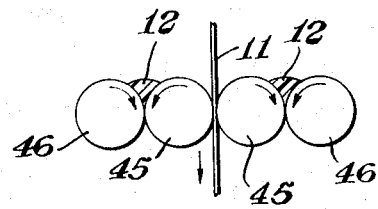
Figure 5:
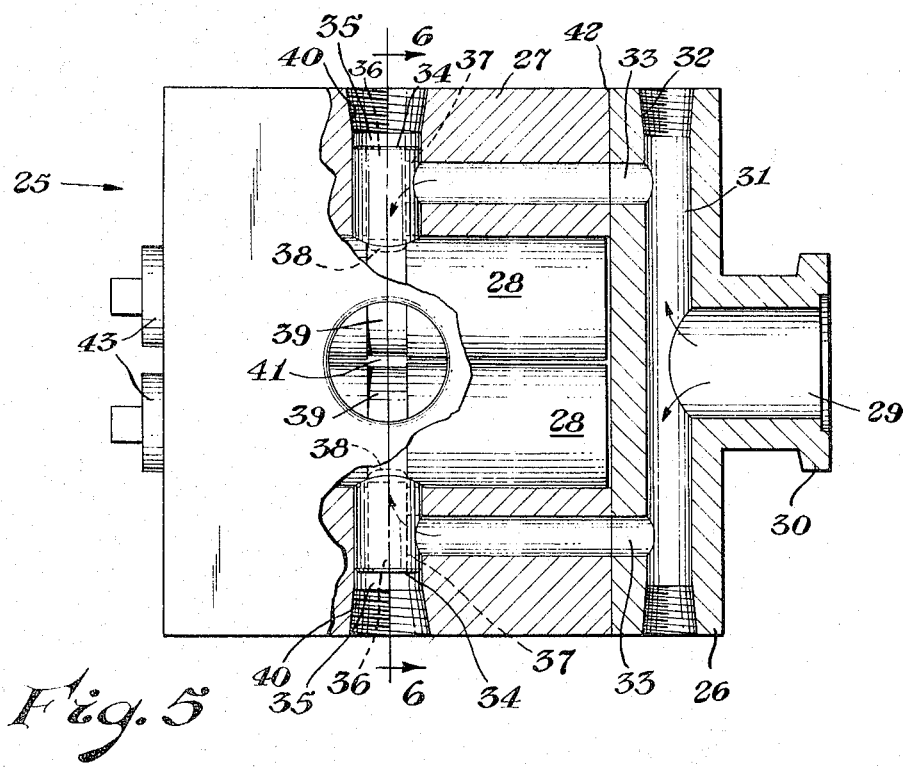
Figure 6:
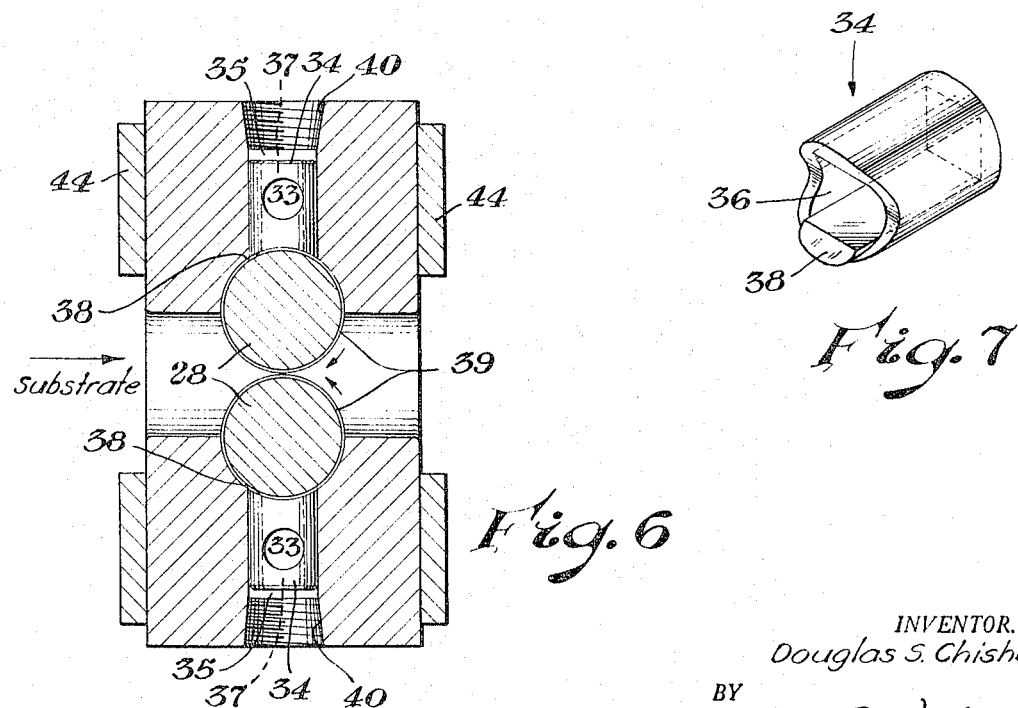
Figure 7:
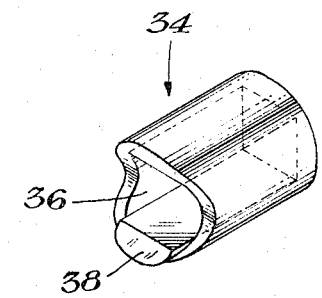

FIGURE 4, in schematic and diagrammatic elevation, partly in cross-section, illustrates one means of preparing the coated products of the invention;

FIGURE 5, in front vertical cross-section, illustrates a preferred embodiment of the apparatus that is employed to produce the products of the invention;

FIGURE 6 is an assembly view, in vertical cross-section, taken along line 6—6 of FIGURE 5;

FIGURE 7 is a perspective view of the sleeve and damming means used to control the direction of polymer flow;

FIGURE 8 is an enlarged fragmentary front view depicting another configuration of the orifice-like opening between the rolls of FIGURE 5 that may be employed in the practice of the invention;

FIGURE 9 is a diagrammatic view of another embodiment of a roll coating apparatus in accordance with the invention.

Figure 1:
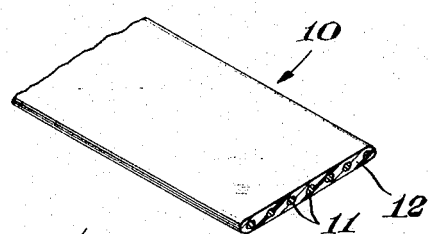
Figure 2:
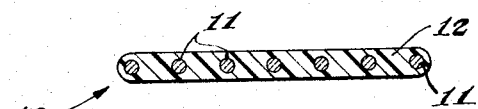
FIGURE 2 illustrates the tape of FIGURE 1 in fragmentary cross-section.

With initial reference to FIGURES 1 and 2, there are illustrated a preferred embodiment of a composite tape or tape-like product of the invention, generally designated by the reference numeral 10. The composite tape 10 is comprised of a plurality of twisted continuous filament yarns 11 over which and between which is deposited a resin layer 12 of a normally solid thermoplastic polymer.

Figure 3:
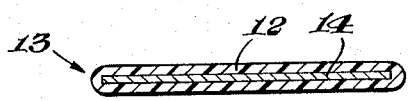
FIGURE 3 illustrates a fragmentary cross-section of the tape of FIGURE 1 when the core is a continuous sheet or web.

Referring to FIGURE 3, another product embodied by the invention, generally designated by the reference numeral 13, is illustrated in cross-section differing from tape 10 of FIGURES 1 and 2 principally in that a continuous web 14 of a suitable and desirable material is substituted for the individual twisted continuous filament yarns 11.

As mentioned, the layer 12, in the tape 10, serves to both protect the yarns 11 while simultaneously effectively bonding them together. The continuous filament yarns, having excellent tensile properties, provide a strong core so that the resulting tape product possesses both good longitudinal properties (due to the yarns) and transverse properties (due to the polymer coating). Also, if the yarn 11 is deleteriously effected by the environment in which it is exposed, the thermoplastic coating 12 frequently protects and preserves the yarns. A thickness of 1–10 mils (1/1000 in.) of polymeric resin on the exterior of the yarns is beneficial. Advantageously, 3–5 mils are employed.

A particularly advantageous feature of both products 10 and 13, and similar products prepared according to the invention, is that they are totally encapsulated by the polymer coating 12. Thus, depending somewhat on the thermoplastic polymer employed, the substrate or core yarns are protected from moisture and the like and are insulated from contact with other materials.

The tape structures of FIGURES 1 and 2 have particular utility as strapping or binding material to hold together boxes, crates and bundles of various sizes, shapes and materials, as well as for webbing for chairs and the like and other functional and decorative uses. They are particularly suited, due to their superior tensile properties, for strapping together rather large and heavy bundles of materials and which may be subjected to rather abusive and severe handling. In this connection, the instant tapes can be used in applications where steel strapping is employed providing at least equal degrees of efficiency and most frequently overcoming many of the inherent well-known drawbacks of steel strapping. The tapes are generally flexible and can be bent or curved around sharp edges and made to conform to, or approximately so, the geometrical shape of the container or bundle to which the tape is being applied. Marring and "cutting-into" the bound container is thus minimized.

The twisted continuous filament yarns formed by twisting together two or more filaments can be of any material that is suitable to be shaped or fabricated into a continuous filament such as by spinning or extruding through an orifice or die. These might generally be referred to as fiber-forming materials and include regenerated cellulose, e.g., rayon; polyamides; e.g., polymerized ε-caprolactam, copolymerized hexamethylenediamine and adipic acid; polyesters, e.g., polyethyleneterephthalate; acrylics, e.g., polymers containing at least 80 weight percent polymerized acrylonitrile in the polymer molecule; polyolefins, e.g., polyethylene, polypropylene, copolymers of ethylene and propylene, etc. The continuous filaments may be formed or spun by any suitable method such as wet, dry, or melt spinning, the method depending somewhat on the polymer characteristics. Instead of the twisted continuous filament yarns, continuous monofilaments of round or semi-round or essentially flat cross-section and similar ribbon-like material may be employed.

In addition to the continuous filament yarns, other strandular or funicular materials may be employed in the tape structure in the practice of the invention. For instance, plied yarns derived from staple fibers of natural or synthetic origin may equally well be utilized. Additionally, wires, whether bare or coated, glass fibers and the like may be coated and encapsulated in accordance with the instant invention. Thus, the resin-encapsulated wire(s) may be used as an electrical conductor and associated uses, particularly where relatively flatness is critical or advantageous such as that evidenced in television antenna lead-in wires.

The yarns, wires, ribbons and other such strandular substrates may be spaced in any convenient manner while passing between the coating rolls and are thus coated and fixed in the prearranged position. Ordinarily, a general parallel side-by-side arrangement and a single yarn thickness is preferred. The yarns, etc. may be placed in tightly packed side-by-side relationship or touching only slightly or touching only sporadically in random fashion or not touching at all. It is usually preferable that the yarns, etc. are in relatively loose side-by-side relationship so that each individual yarn is more or less completely encapsulated with resin thus assuring good lateral bonding between the yarns.

Other than the strandular or funicular substrates, relatively flat ribbon, sheet or web-like substrates may equally well be treated in the practice of the invention. These might be textile fabrics, webs, nettings, lace and the like, or paper, paperboard and similar structures. Thus particular advantage is found in coating paperboard of the type used in milk cartons and other liquid-containing cartons.

It is known to coat paperboard for these purposes with polyethylene and other thermoplastic polymers. However, a persistent difficulty has been that the edges of the paperboard remain uncoated and become swollen with liquid which frequently leads to leaks. With the practice of the present invention, not only are both sides of the paperboard simultaneously coated, but also the edges are effectively and efficiently coated.

In short, any polymeric resin of a film-forming variety that may be satisfactorily melt extruded can be employed for the resin layer 12 applied over the surface of substrate 11 or 14. Included in these resins are polymers of vinyl chloride, vinylidene chloride and copolymers thereof with other vinyl monomers; polyolefins; polyamides; cellulose ether and cellulose ester polymers; and polyesters such as polyethylene terephthalate, etc.

In a preferred embodiment of the invention, non-aromatic hydrocarbon polyolefins that are prepared by polymerization of mono-olefinic aliphatic olefin monomers are employed for the resin layer 12. Principally, those mono-olefin aliphatic olefin monomers (including polymerizable mixtures thereof) that contain from 2 to about 8 carbon atoms, such as ethylene, propylene, butylene and so forth are utilized.

The polyethylene or other non-aromatic hydrocarbon polyolefin which is preferably employed in the practice of the present invention, as mentioned, may be polymers of any normally solid and film-forming nature. For example, the polymers of ethylene which are employed may be those, or similar to those, which sometimes are referred to as "polythenes" and which may be obtained by polymerizing ethylene in a basic aqueous medium and in the presence of polymerization-favoring quantities of oxygen under relatively high pressures in excess of 500 or 1,000 atmospheres at temperatures which may be between 150° and 275° C. Or, if desired, the ethylene and other non-aromatic hydrocarbon olefin polymers may be essentially linear polymers, or polyolefin products similar to these materials. The essentially linear, macromolecular, high density polyethylenes have been referred to as "ultrathenes." They ordinarily have greater apparent molecular weights (as may be determined from such characteristics as their melt viscosities and the like) than the "polythene" type polyethylenes which are usually in excess of at least about 20,000 and generally in excess of about 40,000; densities of about 0.94–0.96 gram per cubic centimeter; and melting points in the neighborhood of 125–135° C. They are also ordinarily found to have a more crystalline nature than conventional polyethylenes and may contain less than 3.0 and even less than 0.3 methyl radical per 100 methylene groups in the polymer molecule. The essentially linear and unbranched polymers of ethylene and other non-aromatic hydrocarbon olefins may be obtained under relatively low pressures of 1 to 100 atmospheres using such catalysts for polymerizing the ethylene or other olefin as mixtures of strong reducing agents and compounds of Group IV–B, V–B and VI–B metals of the Periodic System; chromium oxide on silicated alumina; hexavalent molybdenum compounds; and charcoal supported nickel-cobalt.

If desirable, certain agents may be applied to the substrate yarn or web to provide better adhesion, or if desired in certain cases, thermal insulation, between the substrate and resin. Exemplary of some of the adhesion promoting agents that may beneficially be utilized are the well-known titanates or titanium organics or resinous organic nitrogen polymers discussed in U.S. Patent No. 2,887,405. Particularly beneficial in this respect are the polyalkyleneimines and advantageously one of the polyethylene imines which are of the general structure:

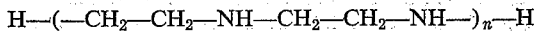

in which $n$ has a numerical value of at least 1 and may be a larger, plural integer having a value as great as 1,000–2,000 and more.

Conveniently, these polyalkyleneimines can be applied to the substrate yarn or web by spraying, doctoring, wiping, etc. a solution of the polyalkyleneimine in water or alcohol, and then drying the treated substrate by any suitable conventional means prior to the coating of the substrate with the desired polymeric resin.

With reference to FIGURE 4 of the drawings, there is illustrated one means of manufacturing the composite tape or tape-like structures of the invention. As shown, the twisted continuous filament yarns 11 are taken from a creel or beam 15 which contains a plurality of ends of yarns 11. The yarns are led through a spacer 16 serving to space and align the yarns in a general parallel and close relationship with one another prior to entering the nip of driven rolls 17 rotating in the direction of travel of yarns 11 as indicated by the directional arrows.

The yarns, so-aligned, are then passed through an orifice-like opening between coating rolls 18. The orifice-like opening is created by coacting regular circumferential grooves on coating rolls 18. Molten polymeric resin 19 is introduced through ports 20 to the grooves at approximately 180° from point where yarns 11 pass through the orifice opening between the rolls. Although, preferably, the resin is applied to the rolls at this 180° removal from the yarns, other points of resin application can also be utilized. Coating rolls 18 are driven, as indicated by the directional arrows, counter to the direction of travel of yarns 11 and carry molten resin 19 into the orifice opening where the resin is applied to yarns 11 completely encasing or encapsulating the yarns and creating a continuous surface. Tape 10 is then forwarded to a pair of driven nip rolls 21 rotating in the direction of travel of tape 10, as indicated by the directional arrows. Rolls 21 serve to smooth resin coating 12 (or if desired, may be adapted to create an embossing effect on the resin surface) and may be cooled to expedite cooling and complete solidification of the resin. Rolls 21 and 17 cooperate to control the tension of the yarns passing between coating rolls 18. In place of rolls 17 other suitable conventional tensioning means may be employed such as drag bars. The composite tape 10 may be taken up for subsequent use by any suitable means or in any desired manner, such as the take-up roll 22 onto which the tape is shown being wound in FIGURE 4 of the drawing. Of course, if desired, it can be passed, without intermediate take-up, to any subsequent manufacturing operation in which it may be employed.

A significant and critical feature of the invention is that coating rolls 18 must be driven counter to the direction of travel of the substrate passing between the rolls in order to obtain efficient and uniform coating and encapsulating. In this connection, it is significant to note that inferior and frequently essentially no coating at all of the substrate material takes place when coating rolls 18 are rotated in the direction of travel of the substrate being coated. Similar inferiority is evidenced when the rolls are not rotated at all.

Depending somewhat on the spacing of yarns 11, in the normal practice of the present invention each individual yarn is essentially completely covered by the resin about its total circumference or surface.

It is to be understood that the invention is not limited to the production of a single tape or coating of a single web. That is, a plurality of tapes can be simultaneously produced on the same set of coating rolls by providing the rolls with as many orifice openings as necessary in conjunction with a suitable header system for distributing polymeric resin to each groove. Along this same line, the width of the tape or web-like article is not critical and can be of any desired width.

As previously indicated, nip rolls 17 and 21 serve to forward the yarns and tape and to control the tension on the yarns while being coated. Ordinarily, rolls 17 and 21 are driven at the same speed. As a preferred processing variable, the nip of rolls 21 is in the same plane as the orifice opening between rolls 18 so that the freshly formed tape 10 is pulled horizontally away from the coating rolls.

Polymeric resin 19 is preferably delivered in molten form under pressure to the grooves of coating rolls 18 at opposite sides of each of the rolls from where the grooves coact to form the orifice between them. In other words, the feed points are 180° apart. This arrangement minimizes the tendency of the rolls to bend under the pressure exerted by the polymer feed since any tendency of one roll to bend is counteracted by the other roll. The temperature of the melt and the coating rolls is maintained above the fusion point of the particular polymer but below the temperature at which any substantial polymer degradation will occur. Care should be exercised that the polymer not be allowed to solidify prior to its application to the substrate.

The rate at which polymer resin is fed to the rolls will depend on the thickness of the coating desired and the rate of travel of the substrate to be coated. Assuming a constant rate of metering of the polymeric resin to the rolls, if the substrate speed is too slow resin will tend to collect in the opening and create an uneven and undesirable coating; if the substrate speed is too high, the resin will be drawn away from the orifice opening by the substrate resulting in inferior coating. It is important that the resin be applied to the substrate while passing through the orifice. This is particularly true when a plurality of yarns are being formed into a tape and when it is desirable to assure efficient filling of the resin between the yarns thus creating strong lateral bonding between the yarns. The rolls may be heated by any suitable means, such as conductive electrical heating, to assist in keeping the resin in molten condition from the point at which the melt is applied to the rolls to the point of application of the melt to the substrate. For better efficiency, the roll diameter is maintained at a minimum.

In some instances, particularly when forming a tape from a plurality of yarns wherein knots are frequently encountered (through splices and the like), it may be desirable to slightly tilt the roll coating apparatus or merely the rolls such that the plane containing the roll axes is other than perpendicular to the plane of the substrate passing between the roll orifice. Tilting the rolls either way such that the upper or lower roll orifice surface first contacts the substrate is equally satisfactory. Alternatively, the angular entrance of the substrate to the orifice opening can be other than horizontal. For example, when a plurality of yarns having a 0.020 in. diameter per yarn are being coated between rolls having a distance between center lines of about 1.164 inches and in which the orifice opening between the rolls is 0.020 in., any knots in the yarns, which are ordinarily larger than 0.020 in. in diameter would not pass through the orifice. To accommodate the knots, the height of the orifice may be increased, for example, from 0.020 in. to about 0.035 in. and the angle between the common plane of the roll axes and the plane of the substrate may be changed from the normal 90° to about 80°. This results in tangency of the substrate to the coating surfaces at points about 0.2 in. apart and thus about 0.1 in. on either side of the common center line of the rolls. This modification provides excellent complete encapsulation of the yarns (or other substrate) and alleviates any difficulties due to knots or other non-uniformities in thickness.

As another modification of the invention, which is particularly beneficial when polymeric resins are employed that tend to degrade thermally, the resin is applied under pressure as a powder, flakes or granules to the heated rolls where it can "wipe" off and melt on the rolls thus forming a molten coating which is transferred to the coating point.

Another modification within the scope of the invention is to pressurize the side of the orifice between the coating rolls opposite to which the substrate enters thus creating a film bubble generator. Certain novel products can be created using this modification. For instance, two wires or similar strandular materials may be encased at the lateral extremities of a tape-like structure and be separated from each other in the interior of the structure by an air space.

Referring now to FIGURE 5, there is shown a preferred embodiment of the reverse roll-coating apparatus for providing the products of the invention. As shown, the coating apparatus, generally referred to by reference numeral 25, comprises header 26, housing 27, and rolls 28. Header 26 is provided with an inlet or primary port 29 through which molten polymeric resin is fed under pressure from a suitable screw pump or other means (not shown). Flange 30 of header 26 is adapted to be secured to the terminating end of the screw pump or other suitable resin forwarding means. Primary port 29 terminates arcuately in secondary port 31 which extends perpendicularly equal distances from the midpoint of primary port 29. The end portions 32 of secondary port 31 are threaded to receive threaded plugs (not shown) which are tightly screwed in place when the apparatus is in use but can be readily removed to facilitate cleaning of the ports during non-use. Intermediate the midpoint and end portions of secondary port 31, branch ports 33 arcuately interconnect perpendicularly with secondary port 31. Branch ports 33 extend through housing 27 and arcuately terminate and perpendicularly interconnect with sleeves 34. Sleeves 34 are circular sleeves adapted to be inserted and fixed in feed ports 35 to generally control the direction of resin flow. Sleeves 34 are provided with a longitudinal bore 36 which interconnects with side bore 37. The inner extremities of sleeves 34, terminating arcuately adjacent rolls 28, are provided with a protuberance or dam 38 which extends towards rolls 28. Dam 38 extends slightly, and in close proximity, along the sides of grooves 39 in rolls 28 on the sides of the roll opposite to which the resin is intended to flow or be carried.

The exterior terminations 40 of feed ports 35 are threaded to receive threaded plugs (not shown) which are tightly screwed in place during operation but which can be readily removed to facilitate cleaning of the ports or to inspect rolls 28.

A groove 39 in each of rolls 28 extends circumferentially around the roll. Each groove is essentially shaped to have flat straight bottoms and slightly curved edges, although for some purposes curved or round bottomed grooves may be more beneficial. The grooves may be of any convenient width and depth. For optimum performance, grooves 39 are of such dimensions to provide an opening 41 only slightly larger than the substrate that is to be passed through the opening. That is, more efficient coating or encapsulating is accomplished when the substrate to be coated nearly completely fills the opening with allowances for the volume that will be taken up by the resin coating.

Conveniently, as indicated, coating apparatus 25 is comprised of three principal assemblies. Header 26 is mounted to housing 27 at interface 42 by suitable bolting means. In order to assure leak-free operation, the opposing sides of the housing and header are usually fined or lapped.

Rolls 28 are advantageously fitted into housing 27 employing bearing clearances. For instance, a nominal clearance of 0.010 inch is profitably used between the rolls and housing and between the rolls themselves. Highly polished roll surfaces are desirable for obvious reasons. Rolls 28 are, for all practical purposes, free running in housing 27 in that no bushing or bearing surfaces are engaged by the rolls. Support for the rolls is provided at the drive end of the rolls by couplings 43. An Oldham coupling, as indicated in FIGURE 5, is beneficial for this assembly. With advantage, rolls 28 are driven from a common power source (not shown) to assure equal rotational speeds of both rolls. However, in some instances, which can be utilized to provide certain desirable effects, the rolls may be run at different relative speeds. During operation there is a tendency for slight amounts of resin to seep out between the rolls and housing but this creates no difficulties, and in fact, a self lubricating action is afforded.

The materials of construction used in coating apparatus 25 may be any of a number of materials which are commonly utilized in operations of the sort for which the apparatus is adapted. Ordinarily, mild steel, stainless steel or the like are employed. However, other materials, such as bronze or aluminum may be desirable for the housing and rolls to take advantage of the better heat transfer properties of these materials since it is important that the thermoplastic resin be kept in molten form until applied to the substrate.

Referring to FIGURE 6, there is shown an assembly view of the apparatus of FIGURE 5 taken along line 6—6. Therein can be seen the general relationship between dam 38 and roll 28. The direction of rotation of the rolls during operation is indicated by the directional arrows. Also, there is shown one means of heating housing 27 and rolls 28 by the electrically heated strip heaters 44 which may be fastened to housing 27 by any convenient means.

In FIGURE 7 there is shown an enlarged perspective view of sleeve 34 and associated dam 38. As indicated, the bore through sleeve 34 is square but this is not a critical feature and can just as conveniently be circular. It is to be understood that the depicted damming means is a preferred embodiment but the invention it not to be limited to this particular means for controlling polymer directional flow.

With reference now to FIGURE 8, there is shown a fragmentary front section showing another embodiment of the opening 41 between rolls 28 of FIGURE 5. The opening configuration shown in FIGURE 8 is particularly suited when a tape-like structure is to be produced by coating and bonding together a series of independent yarns, cords, wires or the like strandular structures. Thus, each of the semi-spherical openings within the principal opening are adapted to have a single yarn or cord running through it. This particular arrangement assists in keeping the yarns parallel and from contacting each other when this latter feature is of particular importance.

In FIGURE 9 is indicated another embodiment of the present invention. As shown, a substrate 11 is passed between a pair of coating rolls 45 rotating in the direction indicated by the directional arrows and having the general configuration of rolls 28 in FIGURE 5. Molten polymeric resin 12 is delivered from a suitable source (now shown) to and supported between coating rolls 45 and rolls 46 which rotate counter to rolls 45 (as indicated by the directional arrows). Alternatively, solid polymer resin may be situated between rolls 45 and 46 and there be melted by the heated surfaces of rolls 45 and 46. In either case, molten polymer resin 12 is wiped onto rolls 45 and carried to the point of contact with substrate 11 where it is applied to the substrate. The preferential delivering of resin to coating rolls 45 is accomplished by either running rolls 45 and 46 at the same speed and using for roll 46 a larger diameter roll than roll 45, or, using equal diameter rolls and running roll 45 faster than roll 46. The apparatus and process as depicted in FIGURE 9 has the advantage of not having to provide polymeric resin under pressure to the coating rolls.

In order to further illustrate the invention, twelve yarn ends of twisted continuous filament rayon yarn of the type used for tire cords were drawn from a beam, wound around tensioning pins and passed through a spacer where the yarns were parallelized in a single plane. The yarns were spaced in side-by-side relationship without permitting the yarns to touch one another. The yarns, maintained in this non-touching side-by-side arrangement, were passed through the opening between the rolls of the coating apparatus as described with reference to FIGURE 5 herein at a rate of about 100 feet per minute. The coating rolls were rotated counter to each other and counter to the direction of travel of the yarn passing between them. On the exit side of the coating rolls, spaced several feet from the coating rolls, was a pair of driven nip rolls which served to pull the yarns from the beam and through the coating rolls. The nip of these driven rolls was in the same plane as the opening between the coating rolls.

A copolymer of about 90 percent linear polyethylene of the "ultrathene" type and about 10 percent acrylic acid in molten form (approximately 550° F.) was delivered to each of the grooves in the coating rolls at 180° from the point at which the yarns passed through the opening created between the rolls by the grooves. The molten copolymer was fed to the coating rolls at a rate of about 75 grams per minute (combined amount for both rolls). The molten copolymer was then carried around on the surfaces of the grooves and applied to the rayon yarns passing between the rolls. In order to assure that the copolymer remained in molten condition at least until contacting the yarns, electric conduction heaters were attached to the sides of the coating apparatus as illustrated in FIGURE 6. The coated yarns were pulled through the air for a short distance, whereby solidification of the copolymeric resin was accomplished, to the nip rolls and the so-produced tape was then wound onto a storage spool.

The resulting tape structure was about 13/16 in. wide and about 1/32 in. thick. Excellent and total encapsulation of the yarns was obtained in that a continuous surface of solid polymeric resin was generated over both sides and both edges of the tape. Additionally, the spaces between each individual yarn were filled with resin providing complete bonding between the yarns. Thus, each yarn within the tape was totally encased with resin. The tape had excellent flexibility, tensile and transverse properties. The bond between the rayon yarns and resin was good.

Similar excellent results were obtained when the procedure of the foregoing was employed excepting to space the yarns closer together and allowing them to touch one another in places.

Commensurate results were obtained when the rayon tire cords of the foregoing were coated as discussed with a polyethylene of the "polythene" type. In this example the yarns or cords were spaced tightly together in side-by-side arrangement before being passed through the coating apparatus. A tape of about ½ in. width was produced. At casual observation it appeared that the individual yarns were touching along their entire length; however, on close investigation it was observed that the yarns were separated by a thin layer of polyetheylene between the yarns.

In another example, tapes were produced using the above-described procedure excepting to employ rayon yarns that had first been passed through about a 5 weight percent solution of polyethyleneimine in ethanol and then dried. Tapes of very good physical properties were obtained exhibiting excellent bonding between yarns and resin.

In the same general fashion, excellent results were obtained according to the practice of the present invention when 12 ends of 22 gage bare copper wire were coated with polythene-type polyethylene in tape form as before. Further, steel tape, woven cloth tape, and paperboard of the type employed in milk cartons were excellently totally encapsulated with a thermoplastic polymeric resin in accordance with the invention.

Although the discussion of the invention has been limited to the coating of relatively flat substrates, it is within the scope of the invention, for instance, to coat a group of strands and the like that are arranged in a bundle.

Certain changes and modifications of the present invention can be readily entered into without substantially departing from its intended spirit and scope. Therefore, it is to be fully understood that the invention is not to be limited or in any way restricted by the preferred embodiments thereof which are set forth in the foregoing description and specification. Rather, its purview is to be interpreted and construed in the light of what is set forth and delineated in the hereto appended claims.

What is claimed is:

1. A method for coating at least two opposing surfaces of a preformed substrate with a normally solid film-forming thermoplastic resin comprising passing said substrate through an opening between two counter-rotating rolls, said opening provided by coacting circumferential grooves in said rolls, the direction of travel of the surface of said rolls at the point at which said substrate passes between said rolls being essentially opposite to the direction of travel of said substrate; applying said normally solid thermoplastic resin in molten form to the surface of said grooves in said rolls; depositing said resin from said surface onto said substrate as it passes through said opening between said rolls; and then cooling said applied resin to solidify same on said substrate.

2. A method for encapsulating a preformed substrate with a normally solid thermoplastic resin comprising passing said substrate through an opening between two counter-rotating rolls, said opening provided by coacting circumferential grooves in said rolls, the direction of travel of the surface of said rolls at the point at which said substrate passes between said rolls being essentially opposite to the direction of travel of said substrate; applying said normally solid thermoplastic resin in molten form to the surface of said grooves in said rolls; depositing said resin from said surface onto said substrate as it passes through said opening between said rolls; and then cooling said applied resin to solidify same on said substrate to form a totally encapsulating coating over said substrate.

3. The method of claim 2, wherein said preformed substrate is a sheet-like substrate.

4. The method of claim 3, wherein said sheet-like substrate is a cellulosic substrate.

5. The method of claim 2, wherein said preformed substrate is a strandular substrate.

6. The method of claim 5, wherein said strandular substrate is a continuous filament rayon yarn.

7. The method of claim 5, wherein said strandular substrate is a continuous filament polyamide yarn.

8. The method of claim 5, wherein said strandular substrate is a wire.

9. The method of claim 2, wherein said normally solid thermoplastic resin is a polymer having as an essential ingredient in the polymer molecule a polymerized monoolefinic aliphatic monomer containing from 2 to 8 carbon atoms in the monomer molecule.

10. The method of claim 9, wherein said polymer is an ethylene polymer.

11. The method of claim 9, wherein said polymer is a propylene polymer.

12. The method of claim 2, and including in addition thereto, treating said preformed substrate with a solution of a polyalkyleneimine prior to coating said substrate with said resin.

13. The method of claim 12, wherein said polyalkyleneimine is polyethyleneimine.

14. A method for producing a non-woven tape comprising aligning in essentially parallel side-by-side relationship a plurality of continuous filament textile yarns;

passing said aligned yarns through an opening between two counter-rotating rolls, said opening provided by coacting circumferential grooves in said rolls, the direction of travel of the surface of said rolls at the point at which said yarns pass between said rolls being essentially opposite to the direction of travel of said yarns; applying a normally solid thermoplastic resin in molten form to the surface of said grooves at a point about 180° from the point at which said yarns pass between said rolls; the temperature of said resin being maintained above its fusion temperature from the time of application of said resin to the surface of said grooves until at least said resin is applied to said yarns; depositing said resin from said surface onto said yarns as they pass through said opening between said rolls; withdrawing said yarns with said applied resin in the same plane as said opening until said resin is sufficiently cooled to solidify on said yarns and form a totally encapsulating coating over said yarns.

15. The method of claim 14, wherein said yarns are yarns of twisted continuous filaments of rayon.

16. The method of claim 14, wherein said yarns are yarns of twisted continuous filaments of a polyamide.

17. The method of claim 14, wherein said normally solid thermoplastic resin is a polymer having as an essential ingredient in the polymer molecule a polymerized monoolefinic aliphatic monomer containing from 2 to 8 carbon atoms in the monomer molecule.

18. The method of claim 17, wherein said polymer is an ethylene polymer.

19. The method of claim 17, wherein said polymer is a propylene polymer.

20. The method of claim 14, and including in addition thereto treating said yarns with a solution of a polyalkyleneimine and drying said polyalkyleneimine-treated yarns prior to coating said yarns with said resin.

21. The method of claim 20, wherein said polyalkyleneimine is polyethyleneimine.

22. The method of claim 14, wherein the height of said opening between said rolls is slightly greater than the diameter of said textile filament yarn and one of the angles formed between the common plane of said plurality of yarns and the common plane of the axes of said rolls is less than 90°.

References Cited by the Examiner

UNITED STATES PATENTS

| | | | |
|---|---|---|---|
| 1,520,342 | 12/1924 | Grabau | 154—53.6 |
| 2,199,228 | 4/1940 | Obenshain et al. | 117—68 |
| 2,523,670 | 9/1950 | Schueler | 264—175 |
| 2,618,580 | 11/1952 | Lancaster | 264—175 |
| 2,784,630 | 3/1957 | Koprow et al. | 264—175 |
| 2,825,558 | 3/1958 | Devaud | 154—53.6 |
| 2,888,902 | 6/1959 | Wells et al. | 118—227 |
| 2,979,431 | 4/1961 | Perrault | 156—181 |
| 2,981,226 | 4/1961 | Murray | 118—227 |
| 3,066,046 | 11/1962 | Walton | 117—68 |
| 3,082,292 | 3/1963 | Gore | 264—174 |
| 3,111,418 | 11/1963 | Gilbert et al. | |
| 3,120,449 | 2/1964 | Griswold | 117—68 |

ROBERT F. WHITE, *Primary Examiner.*

EARL M. BERGERT, A. H. BRODMERKEL,
*Examiners.*

R. J. CARLSON, F. MARLOWE, J. A. FINLAYSON,
*Assistant Examiners.*